(12) United States Patent
Bower et al.

(10) Patent No.: US 7,783,823 B2
(45) Date of Patent: Aug. 24, 2010

(54) HARDWARE DEVICE DATA BUFFER

(75) Inventors: Kenneth S. Bower, Fort Collins, CO (US); Craig Warner, Aspen Court, TX (US); Michael H. Cogdill, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 493 days.

(21) Appl. No.: 11/831,385

(22) Filed: Jul. 31, 2007

(65) Prior Publication Data

US 2009/0037671 A1 Feb. 5, 2009

(51) Int. Cl.
*G06F 12/00* (2006.01)

(52) U.S. Cl. .......................... 711/3; 711/154; 711/167; 711/170; 710/310; 370/412

(58) Field of Classification Search .................. 711/3, 711/154, 167, 170; 710/310; 370/412
See application file for complete search history.

(56) References Cited

U.S. PATENT DOCUMENTS

| 5,956,341 | A | 9/1999 | Galand et al. | |
|---|---|---|---|---|
| 6,795,886 | B1 | 9/2004 | Nguyen | |
| 6,941,425 | B2 * | 9/2005 | Osborne | 711/154 |
| 7,039,058 | B2 * | 5/2006 | Carvey | 370/400 |
| 2003/0120886 | A1 | 6/2003 | Moller et al. | |
| 2004/0054823 | A1 | 3/2004 | Rooney | |
| 2004/0064664 | A1 | 4/2004 | Gil | |
| 2004/0156379 | A1 | 8/2004 | Walls et al. | |
| 2005/0018609 | A1 * | 1/2005 | Dally et al. | 370/235 |
| 2006/0140203 | A1 | 6/2006 | Jain et al. | |
| 2006/0203825 | A1 * | 9/2006 | Beigne et al. | 370/395.42 |
| 2007/0133415 | A1 | 6/2007 | Spink | |

FOREIGN PATENT DOCUMENTS

| GB | 2451549 A | * | 2/2009 |
|---|---|---|---|
| WO | WO-00/72530 A2 | * | 11/2000 |

OTHER PUBLICATIONS

Peh et al., "Flit-Reservation Flow Control," pp. 73-84, IEEE, Jan. 2000.*
UK IPO Search Report dated Oct. 24, 2008 for UK Patent Application GB-2451549-A, Applicant: Hewlett-Packard Development Company, Inventor: Bower et al., 1 page.*

* cited by examiner

*Primary Examiner*—Stephen C Elmore

(57) ABSTRACT

One embodiment includes a system comprising a processor configured to read and write data packets via a data bus to and from at least one additional hardware device. The system also comprises a data buffer configured to store a plurality of consecutive related flits associated with at least one of the data packets in one of a plurality of addressable locations of the data buffer. The system further comprises a pointer memory configured to store a respective pointer associated with each of the plurality of addressable locations of the data buffer.

18 Claims, 3 Drawing Sheets

HARDWARE DEVICE DATA BUFFER

BACKGROUND

In a data transfer system, data packets that are transmitted from one hardware device to another are often buffered to establish an efficient data flow and to prevent data from being lost based on uneven processing capabilities between the devices. One example of a data transfer protocol is a credit flow control protocol in which credits and debits are transmitted between the devices along with the data packets to control times at which data is to be released from a data buffer. A given data buffer can include a plurality of individually addressable locations in which a fundamental unit of data, typically known as a flow control digit or "flit", of the data packets can be stored. Because flits of data may not be read from the data buffer in the same order in which they are written, the associated hardware device can access the flits of data within using pointers that are a record of the addressable location for each individual flit. Therefore, to access a data packet from a buffer, the hardware device can employ a number of pointers corresponding to a respective number of flits of the data packet to find and retrieve each of the flits of the data packet from the data buffer based on each of the respective pointers.

DETAILED DESCRIPTION

Figure 1:
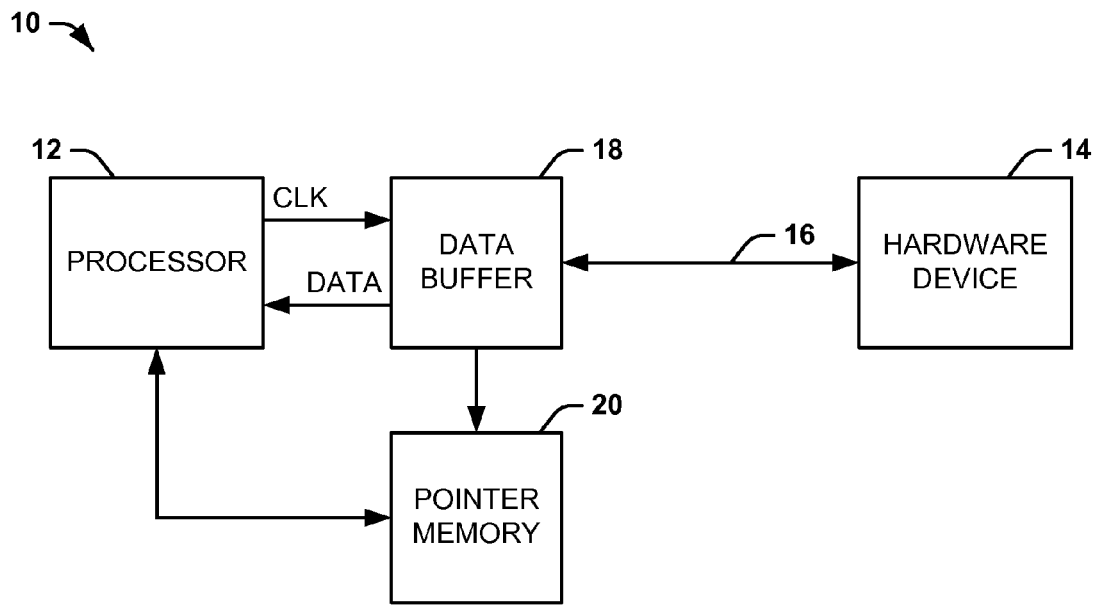
FIG. 1 depicts an example embodiment of a data transfer system.

FIG. 1 depicts an example embodiment of a data transfer system 10. The data transfer system 10 can be implemented in any of a variety of environments, such as between devices on a motherboard or on a network. As an example, the data transfer system 10 can be implemented using a credit flow control protocol. The data transfer system 10 includes a processor 12 and a hardware device 14 that are interconnected by a bus 16. In the example of FIG. 1, the hardware device 14 can be any of a variety of devices, such as a memory, an application specific integrated circuit (ASIC), or a peripheral device configured to communicate with the processor 12 via data packets.

In the example of FIG. 1, data packets that are transmitted across the bus 16 from the hardware device 14 to the processor 12 can be temporarily stored in a data buffer 18. The data buffer 18 can be configured as part of the processor 12, or can be configured separately. As an example, the processor 12 may be unable to receive and immediately process the data packets, and thus the data packets can be stored in the data buffer 18 until the processor 12 is ready to access the data packets for processing. Data packets that are transmitted from the hardware device 14 to the processor 12 can include one or more flow control digits (hereinafter "flits"), which can be a fundamental unit of information of the data packets. As an example, each of the flits can include a consistent number of bits (e.g., 72 bits). A given flit can correspond to a data packet header or other unit of data within the data packet. Therefore, as an example, a given data packet can include one or more packet header flits and a plurality of data flits. As another example, a given data packet, such as a control data packet, can include just packet header flits, and could include no more than a single packet header flit.

The data buffer 18 can include a plurality of individually addressable locations. As the data packets are received at the data buffer 18, pointers that correspond to the addressable locations are generated and are stored within a pointer memory 20. The pointer memory 20 can be any of a variety of memory devices, such as a static random access memory (SRAM) or an SDRAM. The processor 12 can thus identify the locations of the flits to access the flits of a given data packet by retrieving the pointers corresponding to the flits from the pointer memory 20. Thus, the processor 12 can employ the pointers to read the flits from the data buffer 18 based on the identified locations of the flits as described by the pointers in the pointer memory 20.

In the example of FIG. 1, the processor 12 provides a clock signal CLK to the data buffer 18. The processor 12 can read a number of flits from the data buffer 18 based on the clock signal CLK. The clock signal CLK can be generated by the processor 12, or can be externally supplied to both the processor 12 and the data buffer 18. As an example, as demonstrated in greater detail below, the processor 12 can access a number of flits corresponding to multiple pointers (e.g., two) at every clock cycle, such as a rising-edge, of the clock signal CLK.

Each pointer that is stored in the pointer memory 20 can correspond to a respective one of the addressable locations within the data buffer 18. However, each of the addressable locations in the data buffer 18 can include a plurality of storage units that are each configured to store a single flit. Therefore, a given pointer that is stored in the pointer memory 20 can be representative of multiple flits that are stored in the data buffer 18. As an example, multiple consecutive related flits of a given data packet can be stored in a single addressable location that can be identified by a common pointer. As a result, the number of pointers that are employed to track locations of entire data packets can be less than the number of flits of the data packet. Thus, the number of pointers representative of the addressable locations of the data buffer 18 can be significantly reduced relative to existing buffer systems. As a result, less memory space need be allocated within the pointer memory 20 results in more efficient retrieval of pointers corresponding to specific flits of a data packet by the processor 12. In addition, the processor 12 can access multiple flits using a single pointer. As a result, the processor 12 can have a greater bandwidth associated with reading data packets from the data buffer 18 at each clock cycle than if each pointer represented only one flit of the data packet. Furthermore, the flits that are accessed at each clock cycle can correspond to unrelated data packets, such that multiple data packets can be accessed and/or processed at each clock cycle.

It is to be understood that the data transfer system 10 is not intended to be limited to the example of FIG. 1. For example, the data buffer 18 need not be limited to being implemented for the processor 12, but that the data buffer 18 can be configured to store flits of data packets that are intended for any of a variety of hardware devices. As an example, the processor 12 and data buffer 18 can be part of a peripheral device to which another processor provides data packets. As another example, the hardware device 14 can include a processor and a data buffer, similar to the data buffer 18. Therefore, data packets that are transmitted from the processor 12 to the hardware device 14 can be stored in a plurality of storage units within each addressable location of the data buffer. Furthermore, the data transfer system 10, along with the buffering of data in the data buffer 18, is not limited to the application of reading data, but can also be implemented in writing data to other devices, as well. Accordingly, the data transfer system 10 can be configured in any of a variety of ways.

Figure 2:
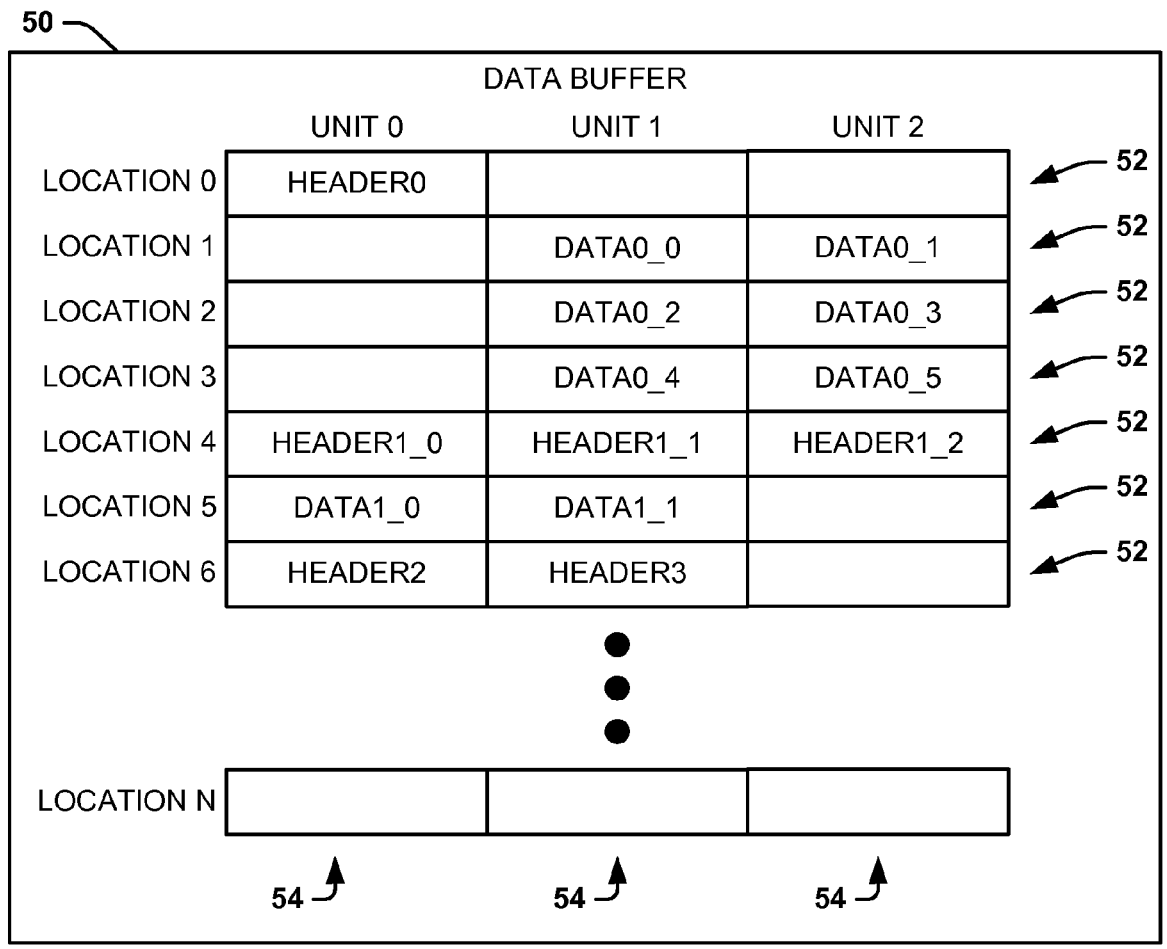
FIG. 2 depicts an example embodiment of a data buffer.

FIG. 2 depicts an example embodiment of a data buffer 50. The data buffer 50 can correspond to the data buffer 18 in the example of FIG. 1. As such, reference is to be made to the example of FIG. 1 in the discussion of the data buffer 50 in the example of FIG. 2.

The data buffer 50 includes a plurality of addressable locations 52, demonstrated as LOCATION 0 through LOCATION N in the example of FIG. 2, where N is a positive integer. Each of the addressable locations 52 includes three of storage units 54, demonstrated as UNIT 0, UNIT 1, and UNIT 2 in the example of FIG. 2. It is to be understood that the data buffer 50 is not intended to be limited to three storage units 54 for every addressable location 52, but could include two storage units 54, or could include more than three storage units 54. Each of the addressable locations 52 can be represented by a single pointer, as demonstrated below in the example of FIG. 3. In addition, each of the storage units 54 within each of the addressable locations 52 can be configured to store a single flit of a data packet. In the example of FIG. 2, the addressable locations 52 and the storage units 54 are arranged as rows and columns, respectively. However, it is to be understood that the arrangement of rows and columns is for ease of explanation, in that the arrangement of the addressable locations 52 and the storage units 54 can be configured in any of a variety of ways to allow access to flits stored in the storage units 54 of a given addressable location 52 with a single pointer.

In the example of FIG. 2, flits are designated as either a packet header flit, corresponding to a header of a given data packet, or a data flit, corresponding to the data that is transmitted in a data packet after the header. A packet header flit is designated in the example of FIG. 2 as HEADERX_Y, where X is a positive integer corresponding to an identifier of the data packet associated with the packet header flit, and Y is a positive integer corresponding to an identifier of the number of the packet header flit within the header of the data packet. A data flit is designated in the example of FIG. 2 as DATAX_Y, where X is a positive integer corresponding to an identifier of the data packet associated with the data flit, and Y is a positive integer corresponding to an identifier of the number of the data flit within the data packet subsequent to the header. A portion of the storage units 54 in each of the addressable locations 52 can be dedicated to storing packet header flits, and another, separate portion of the storage units 54 can be dedicated to storing data flits. Specifically, in the example of FIG. 2, UNIT 0 of the each of the addressable locations 52 can be dedicated to storing packet header flits, and both UNIT 1 and UNIT 2 of the each of the addressable locations 52 can be dedicated to storing data flits.

In the example of FIG. 2, a data packet 0 has been stored in the data buffer 50. The data packet 0 includes a packet header flit, HEADER0, and six data flits, indicated as DATA0_0 through DATA0_5. The packet header flit HEADER0 is demonstrated in the example of FIG. 2 as being stored in UNIT 0 of LOCATION 0. The first two data flits DATA0_0 and DATA0_1 are stored in UNITS 1 and 2 of LOCATION 1, respectively. Likewise, data flits DATA0_2 and DATA0_3 are stored in UNITS 1 and 2 of LOCATION 2, respectively, and data flits DATA0_4 and DATA0_5 are stored in UNITS 1 and 2 of LOCATION 3, respectively. Therefore, the packet header flit HEADER0 is stored in a separate addressable location 52 from the data flits DATA0_0 through DATA0_5, and is stored in UNIT 0 which can be dedicated specifically for the storage of packet header flits. Because the type of flit, packet header or data, can be identified as it is stored in the data buffer 50, the associated pointers can be created to indicate the type of flit (or flits) that are stored in the respective addressable location 52. Therefore, the processor 12, upon retrieving a pointer to access the flits within the data buffer 50, can automatically identify the type of flit (or flits) stored in the addressable location 52, and thus the respective dedicated storage unit(s) 54 with the identified flit type can be accessed by the processor 12.

Figure 3:
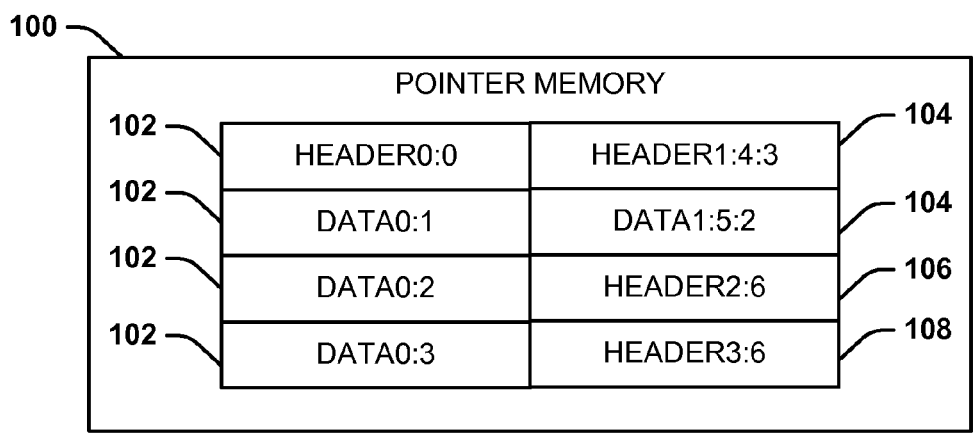
FIG. 3 depicts an example embodiment of a pointer memory.

FIG. 3 depicts an example embodiment of a pointer memory 100 corresponding to the data buffer 50 in the example of FIG. 2. The pointer memory 100 can correspond to the pointer memory 20 in the example of FIG. 1. As such, reference is also to be made to the example of FIG. 1 in the discussion of the pointer memory 100 in the example of FIG. 3.

The pointer memory 100 includes a plurality of pointers 102 that are stored within the pointer memory 100. As an example, the pointers 102 can each be stored in separate word lines of the pointer memory 100. As another example, the pointer memory 100 can be configured as a content-addressable memory (CAM), such that the processor 12 can quickly and efficiently search for a given one or more of the pointers 102 stored therein. Each of the pointers 102 identifies a respective flit (or flits) stored as either HEADERX:Z denoting a packet header flit (or flits) or DATAX:Z denoting a data flit (or flits). The identifier X is a positive integer corresponding to the data packet associated with the flit, similar to as described above in the example of FIG. 2, and the identifier Z is a positive integer corresponding to the addressable location 52 within the data buffer 50.

As described above with respect to FIG. 2, the data packet 0 includes seven flits, HEADER0 and DATA0_0 through DATA0_5. However, because the seven flits of data packet 0 occupy only four addressable locations 52 (e.g., LOCATION 0, 1, 2, and 3) within the data buffer 50, the pointer memory 100 may only store four pointers corresponding to the addressable locations of the flits of the data packet 0. In the example of FIG. 3, those pointers 102 are demonstrated as HEADER0:0 corresponding to the packet header flit HEADER0, DATA0:1 corresponding to the data flits DATA0_0 and DATA0_1, DATA0:2 corresponding to the data flits DATA0_2 and DATA0_3, and DATA0:3 corresponding to the data flits DATA0_4 and DATA0_5. Therefore, the processor 12 need only retrieve four pointers to access each of the flits of the data packet 0. Accordingly, if the processor 12 is configured to access flits associated with two pointers at every clock cycle, the data packet 0 may be fully accessed in two clock cycles.

Instead of or in addition to the dedication of specific storage units 54 within each addressable location 52 to either packet header flits or data flits, an entire addressable location 52 can be allocated to consecutive related flits of a given data packet. In the example of FIG. 2, LOCATION 4 is demonstrated as storing three packet header flits of the same data packet (e.g., data packet 1). Specifically, packet header flit HEADER1_0 is stored in UNIT 0 of LOCATION 4, packet header flit HEADER1_1 is stored in UNIT 1 of LOCATION 4, and packet header flit HEADER1_2 is stored in UNIT 2 of LOCATION 4. Likewise, LOCATION 5 is demonstrated as storing two additional data flits of the data packet 1. Specifically, data flit DATA1_0 is stored in UNIT 0 of LOCATION 5 and data flit DATA1_1 is stored in UNIT 1 of LOCATION 5.

Referring to FIG. 3, the pointer memory 100 includes a pointer 104 associated with LOCATION 4 and a pointer 104 associated with LOCATION 5. Each of the pointers 104 identifies the associated flit (or flits) that are stored as either HEADERX:Z:P denoting packet header flit (or flits) or DATAX:Z:P denoting data flit (or flits). Similar to as described above, the identifier X corresponds to the data packet associated with the flit and the identifier Z corresponds to the addressable location within the data buffer 50. The identifier P is a positive integer that denotes the number of consecutive flits of the respective type of flit in the specific addressable location 52, beginning at the first storage unit 54 (e.g., UNIT 0). Thus, the pointer HEADER1:4:3 denotes that three consecutive packet header flits of the data packet 1 are stored in LOCATION 4, beginning at UNIT 0, and the pointer DATA1:5:2 denotes that two consecutive data flits of the data packet 1 are stored in LOCATION 5, beginning at UNIT 0. Therefore, five flits of the data packet 1 are stored in the data buffer 50, and are represented by only two pointers 102 in the pointer memory 100. Accordingly, the storage configuration of the data packet 1 within the data buffer 50 is another manner of efficiently storing data packets in the data buffer 50 that can be implemented in addition to or instead of the storage configuration of the data packet 0.

Referring back to the example of FIG. 2, the data buffer 50 includes a data packet 2 that includes only a single packet header flit, HEADER2, stored in UNIT 0 of LOCATION 6. In addition, a data packet 3 that likewise includes only a single packet header flit, HEADER3, is stored in UNIT 1 of LOCATION 6. Some data transfer protocols may have restrictions as to a number of flits that can be processed concurrently. As an example, the processor 12 may only be capable of processing a single packet header flit at any given clock cycle of the clock signal CLK. As a result, upon receiving multiple packet header flits, the data buffer 50 can be configured to sequentially store them in a single addressable location 52.

In the example of FIG. 3, the pointer memory 100 includes a pointer 106, HEADER2:6, and a pointer 108, HEADER3:6. Since each of these pointers 106 and 108 refer to the same addressable location 52, LOCATION 6, the processor 12 may be able to identify that separate packet header flits of the data packet 2 and the data packet 3 occupy the same addressable location. Therefore, the processor 12 can identify that the first of the packet header flits that was stored, HEADER2, occupies UNIT 0 of LOCATION 6, and the second of the packet header flits that was stored, HEADER3, occupies UNIT 1 of LOCATION 6. Accordingly, the processor 12 can access the packet header flits HEADER2 and HEADER3 based on retrieving the appropriate pointers 106 and 108, respectively. In the above example of the processor 12 being capable of only processing a single packet header flit at any given clock cycle of the clock signal CLK, the processor 12 can thus stagger access of the packet header flits HEADER2 and HEADER3 to allow the processor 12 to catch-up with the data buffer 50 upon the data buffer 50 being rapidly filled with flits of data packets. As an example, on a given clock cycle, the processor 12 can access the packet header flit HEADER2 along with, for example, the data flits DATA0_2 and DATA0_3. On a next clock cycle, the processor 12 can access the packet header flit HEADER3 along with the data flits DATA0_4 and DATA0_5. Therefore, not only can the processor 12 access a combination of packet header flits and data flits on a given clock cycle, but the flits that are accessed by the processor 12 need not be associated with the same data packet. Accordingly, the data transfer system 10 can remain efficient in storing and accessing the data packets that are transmitted from the hardware device 14 to the processor 12.

It is to be understood that the configuration of the flits within the data buffer 50, as well as the associated pointers 102, 104, 106, and 108 within the pointer memory 100, are not intended to be limited to the example of FIGS. 2 and 3. As an example, although the data buffer 50 is demonstrated as having the flits of related data packets being grouped together from one addressable location 52 to another, it is to be understood that the data packets need not be stored in order of addressable location 52, and may not even be contiguously stored from one addressable location 52 to the next. In addition, the manner in which flits are stored in the data buffer 50 are not intended to be limited to the data packets 0 through 3 as demonstrated in the example of FIG. 2.

The manner in which the data packets 0 through 3 are stored are also not intended to be mutually exclusively implemented relative to each other in the data buffer 50, but that a given data buffer can implement all or less than all of the ways in which the data packets 0 through 3 are stored in the example of FIG. 2. In addition, the manner in which the data packets 0 through 3 are stored, as demonstrated in the example of FIG. 2, is not an exhaustive example, but that other implementations and combinations based on the storage methods demonstrated in the example of FIG. 2 can be realized. For example, a given addressable location 52 can include a packet header flit in UNIT 0 and two data flits in UNITS 1 and 2, respectively, which can be related or unrelated to the packet header flit in UNIT 0. Furthermore, the way in which the pointers 102, 104, 106, and 108 within the pointer memory 100 are demonstrated is intended only as a simplified example for purpose of explanation. As such, the pointers 102, 104, 106, and 108 within the pointer memory 100 can be implemented in a variety of ways, to convey as much information to the processor 12 as necessary to properly identify an ascertainable location of the flits within the data buffer 50. Therefore, the data buffer 50 and the pointer memory 100 can be configured in any of a variety of ways.

Figure 4:
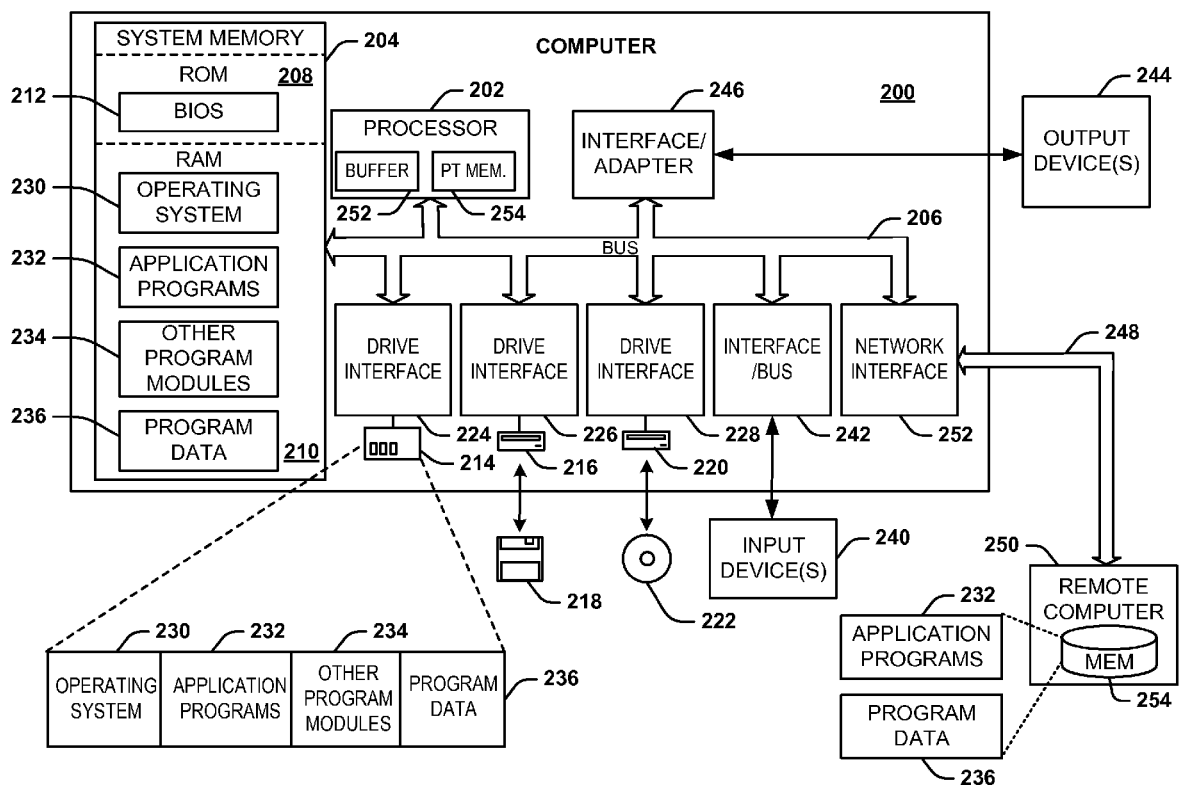
FIG. 4 depicts an example embodiment of a computer system computer system that can implement data buffering to read and write data.

FIG. 4 illustrates an example of a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of a network analyzer or associated design tool running computer executable instructions to perform methods and functions, as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 234, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like. A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more out device(s) 244, such as a visual display device or printer, can also be connected to the system bus 206 via an interface or adapter 246.

The computer system 200 may operate in a networked environment using logical connections 248 to one or more remote computers 250. The remote computer 248 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

By way of further example, the processor 202 can include a data buffer 252, similar to the data buffers 18 and 50 in the examples of FIGS. 1 and 2, respectively, configured to buffer data packets that are transmitted to the processor 202 via the bus 206. The data packets could be transmitted to the processor 202 from any of the drive interfaces 224, 226, and 228, the interface/bus 242, the network interface 252, the interface/adapter 246, and/or the system memory 204. The data buffer 252 could include a plurality of addressable locations, with each addressable location including a plurality of storage units that are each configured to store a flit of data. Thus, the addressable locations can be configured to store multiple consecutive related flits of received data packets. The processor 202 could access pointers that each associated with a given one of the addressable locations from a pointer memory 254 that is included in the processor 202 (e.g., cache). Alternatively, the pointer memory 254 could reside elsewhere in the system 200. Furthermore, the data buffer 252 as described herein is not limited to use solely in the processor 202, but can be included in any of the devices that communicate via the bus 206, such as the drive interfaces 224, 226, and 228, the interface/bus 242, the network interface 252, the interface/adapter 246, and/or the system memory 204.

Figure 5:
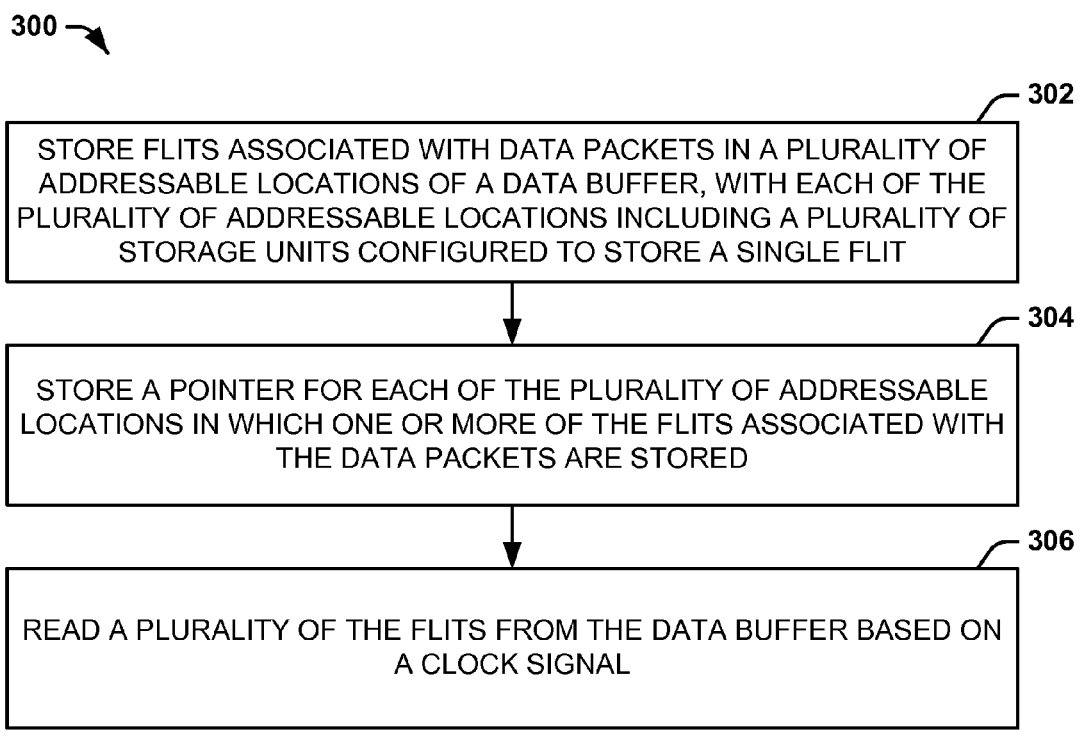
FIG. 5 depicts a flow diagram depicting an example embodiment of a method for buffering data.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer, a computer network or a specially designed test system), software (e.g., as executable instructions running on one or more computer systems or a specially design test fixture), or any combination of hardware and software.

FIG. 5 depicts a flow diagram 300 depicting an example embodiment of a method for buffering data. At 302, flits associated with the data packets are stored in a plurality of addressable locations of a data buffer, each of the plurality of addressable locations comprising a plurality of storage units that are each configured to store a respective flit. At 304, a pointer is stored for each of the plurality of addressable locations in which one or more of the flits associated with the data packets are stored. At 306, a plurality of the flits are read from the data buffer based on a clock signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system comprising:
 a processor configured to read and write data packets via a data bus to and from at least one additional hardware device;
 a data buffer configured to store a plurality of consecutive related flits associated with at least one of the data packets in one of a plurality of addressable locations of the data buffer, each of the plurality of addressable locations of the data buffer comprising a plurality of storage units, each of the plurality of storage units being configured to store at least one of the flits; and
 a pointer memory configured to store a respective pointer associated with each of the plurality of addressable locations of the data buffer, each of the plurality of storage units being addressed by a respective one of the pointers.

2. The system of claim 1, wherein a first portion of the plurality of storage units in each of the plurality of addressable locations is configured to store at least one packet header flit and a second portion of the plurality of storage units in each of the plurality of addressable locations is configured to store at least one data flit, wherein the first portion and the second portion occupying the same respective portions in each of the plurality of addressable locations.

3. The system of claim 1, wherein each of the plurality of addressable locations is configured to store one of at least one packet header flit and at least one data flit of the data packets.

4. The system of claim 3, wherein a plurality of flits associated with a respective plurality of data packet headers are stored in a given one of the plurality of addressable locations.

5. The system of claim 1, wherein the processor is configured to access a plurality of flits from a given one of the plurality of addressable locations based on a clock signal, wherein the plurality of flits is accessed via one pointer stored in the pointer memory.

6. The system of claim 5, wherein the plurality of flits comprises a packet header flit and a plurality of data flits.

7. The system of claim 6, wherein the packet header flit corresponds to a first data packet of the data packets and the plurality of data flits corresponds to a second data packet of the data packets.

8. The system of claim 5, wherein the plurality of flits comprises a plurality of packet header flits associated with one of the data packets.

9. The system of claim 1, wherein the system is configured to operate using a credit flow control protocol for communicating data packets over the bus.

10. A method for transferring data packets, the method comprising:
   storing flits associated with the data packets in a plurality of addressable locations of a data buffer by storing at least one packet header flit in a first portion of the plurality of storage units in each of the plurality of addressable locations and storing at least one data flit in a second portion of the plurality of storage units in each of the plurality of addressable locations, each of the plurality of addressable locations comprising a plurality of storage units that are each configured to store a respective flit, the first portion and the second portion occupying the same respective portions in each of the plurality of addressable locations;
   storing a pointer for each of the plurality of addressable locations in which one or more of the flits associated with the data packets are stored; and
   reading a plurality of the flits from at least one of the plurality of addressable locations of the data buffer based on a respective at least one pointer.

11. The method of claim 10, wherein storing the flits comprises storing one of at least one packet header flit and at least one data flit of the data packets in each of the plurality of addressable locations.

12. The method of claim 10, wherein storing the flits comprises storing a plurality of flits associated with a respective plurality of data packet headers in a given one of the plurality of addressable locations.

13. The method of claim 10, wherein reading the plurality of the flits comprises reading the plurality of the flits from one of the plurality of addressable locations in the data buffer substantially concurrently based on a clock signal.

14. The method of claim 10, wherein reading the plurality of the flits comprises reading a packet header flit associated with a first of the data packets and a plurality of data flits associated with a second of the data packets substantially concurrently based on a clock signal.

15. A system comprising:
   means for transferring data packets between a processor and at least one additional hardware device;
   means for buffering flits associated with the data packets in a plurality of addressable locations, each of the plurality of addressable locations comprising a plurality of storage units that are each configured to store a respective flit; and
   means for identifying each of the plurality of addressable locations in which a plurality of the flits associated with the data packets are stored, the processor accessing the plurality of flits from a given one of the plurality of addressable locations based on a single identifier stored in the means for identifying.

16. The system of claim 15, wherein a first portion of the plurality of storage units in each of the plurality of addressable locations is configured to store at least one packet header flit and a second portion of the plurality of storage units in each of the plurality of addressable locations is configured to store at least one data flit, wherein the first portion and the second portion occupying the same respective portions in each of the plurality of addressable locations.

17. The system of claim 15, wherein the processor is configured to access the plurality of flits from the given one of the plurality of addressable locations based on a clock signal.

18. The system of claim 15, wherein the plurality of flits comprises a packet header flit and a plurality of data flits, the packet header flit corresponding to a first data packet of the data packets and the plurality of data flits corresponding to a second data packet of the data packets.

* * * * *